Feb. 23, 1965  G. E. KEEFER  3,170,680
DRAFT REVERSAL APPARATUS FOR FURNACES
Filed Sept. 26, 1962  6 Sheets-Sheet 1
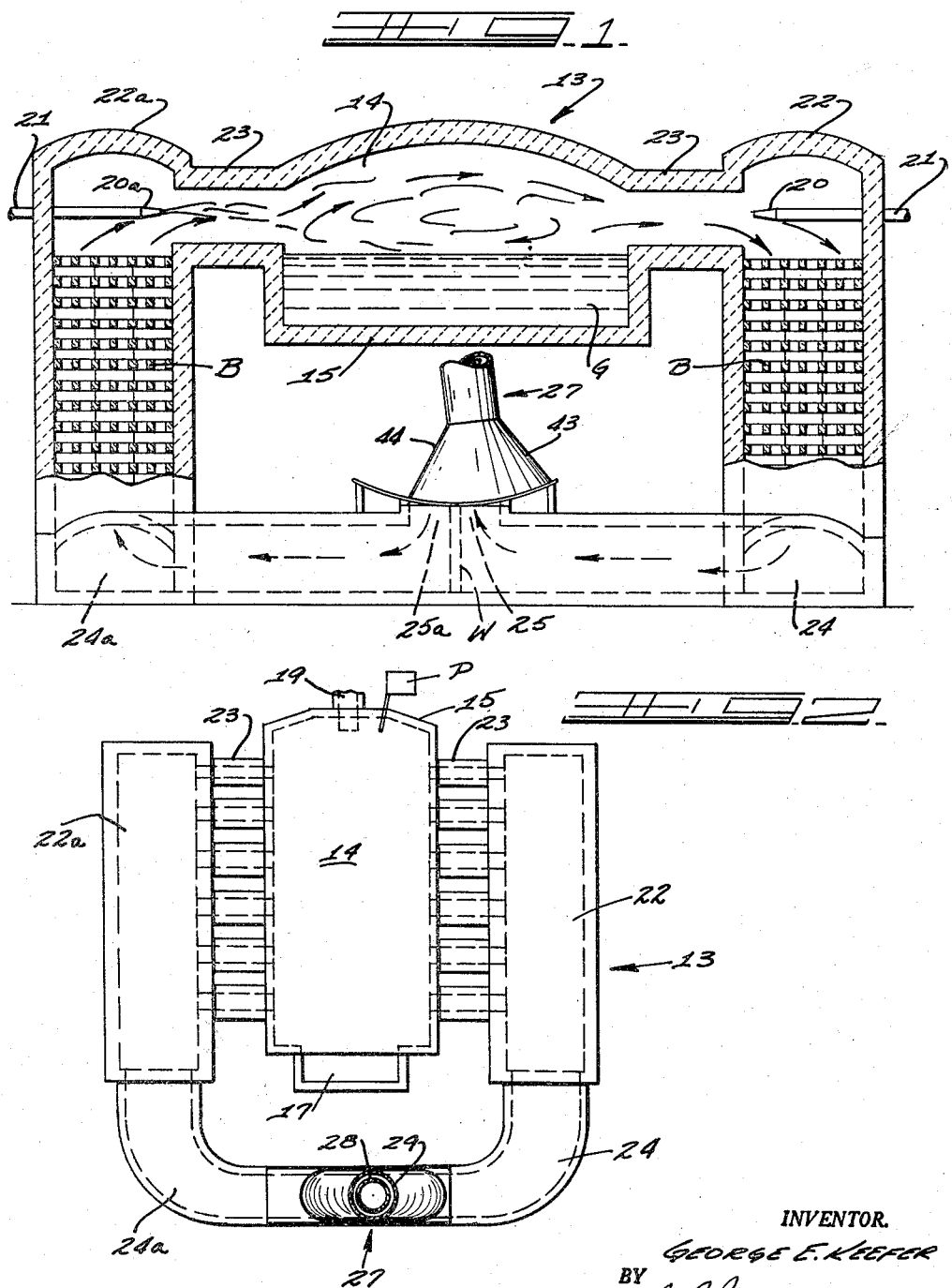
INVENTOR.
GEORGE E. KEEFER
BY
J. R. Nelson
and W. A. Scheich
ATTORNEYS

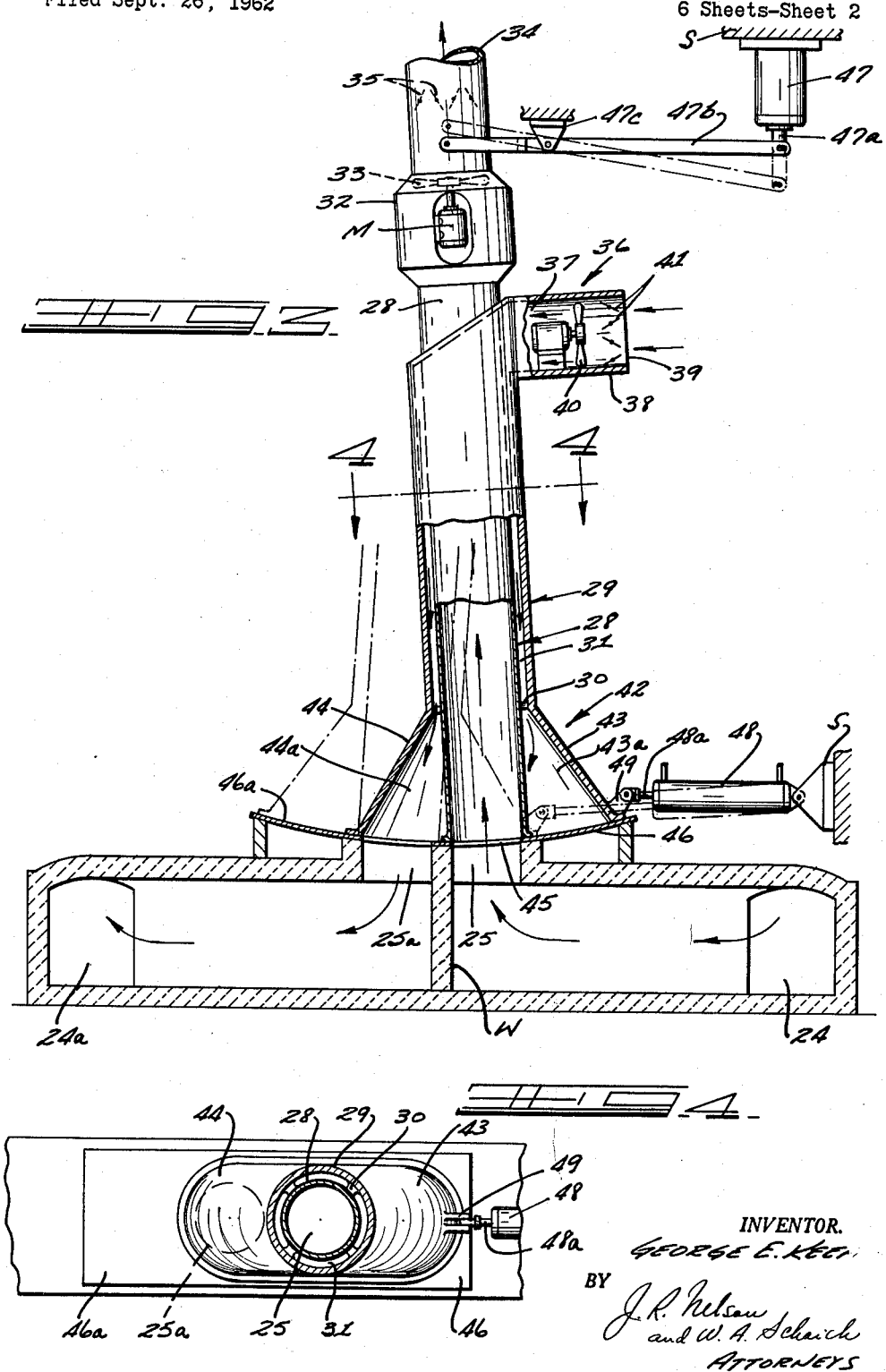

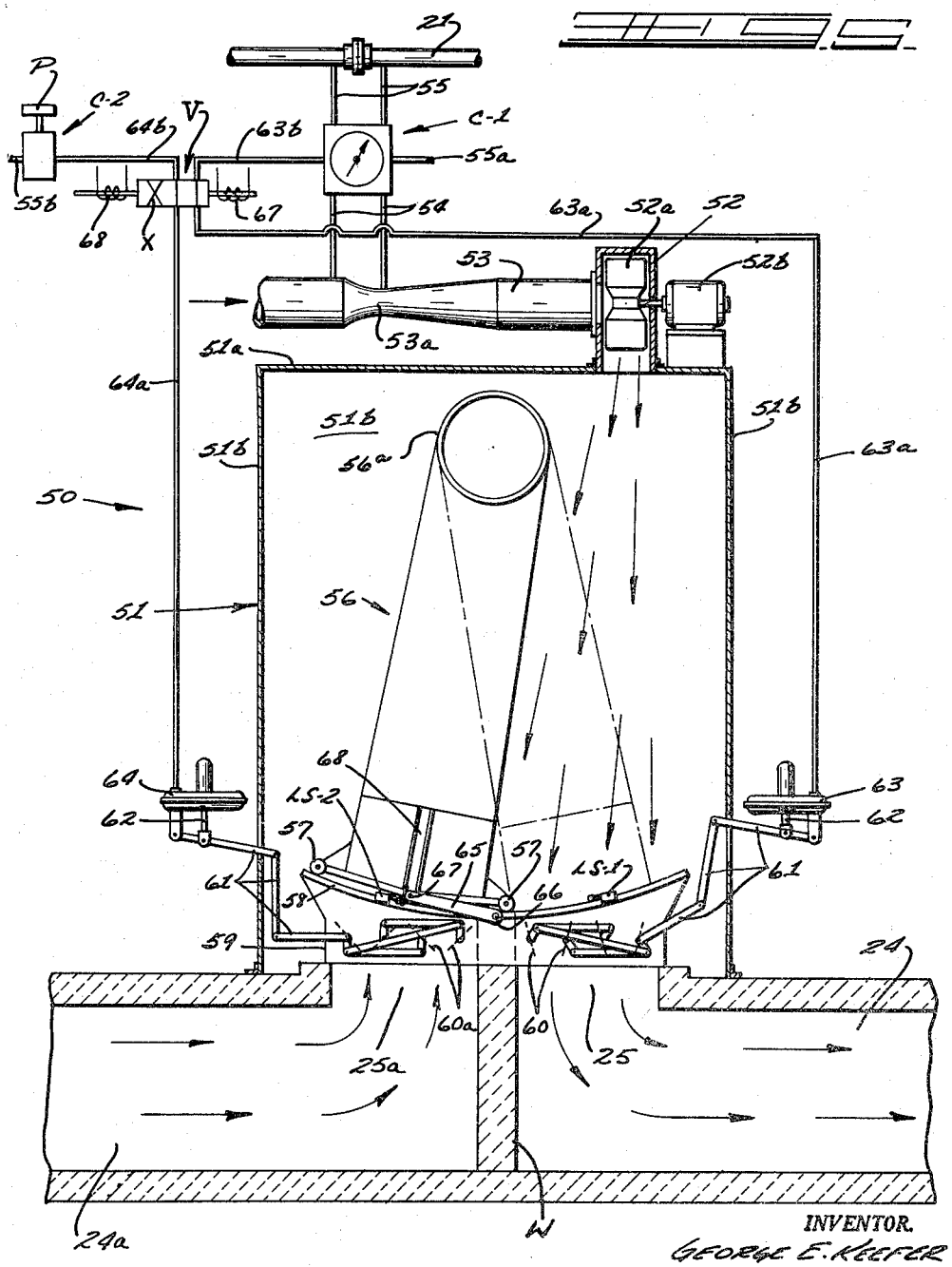

Feb. 23, 1965   G. E. KEEFER   3,170,680
DRAFT REVERSAL APPARATUS FOR FURNACES
Filed Sept. 26, 1962   6 Sheets-Sheet 4
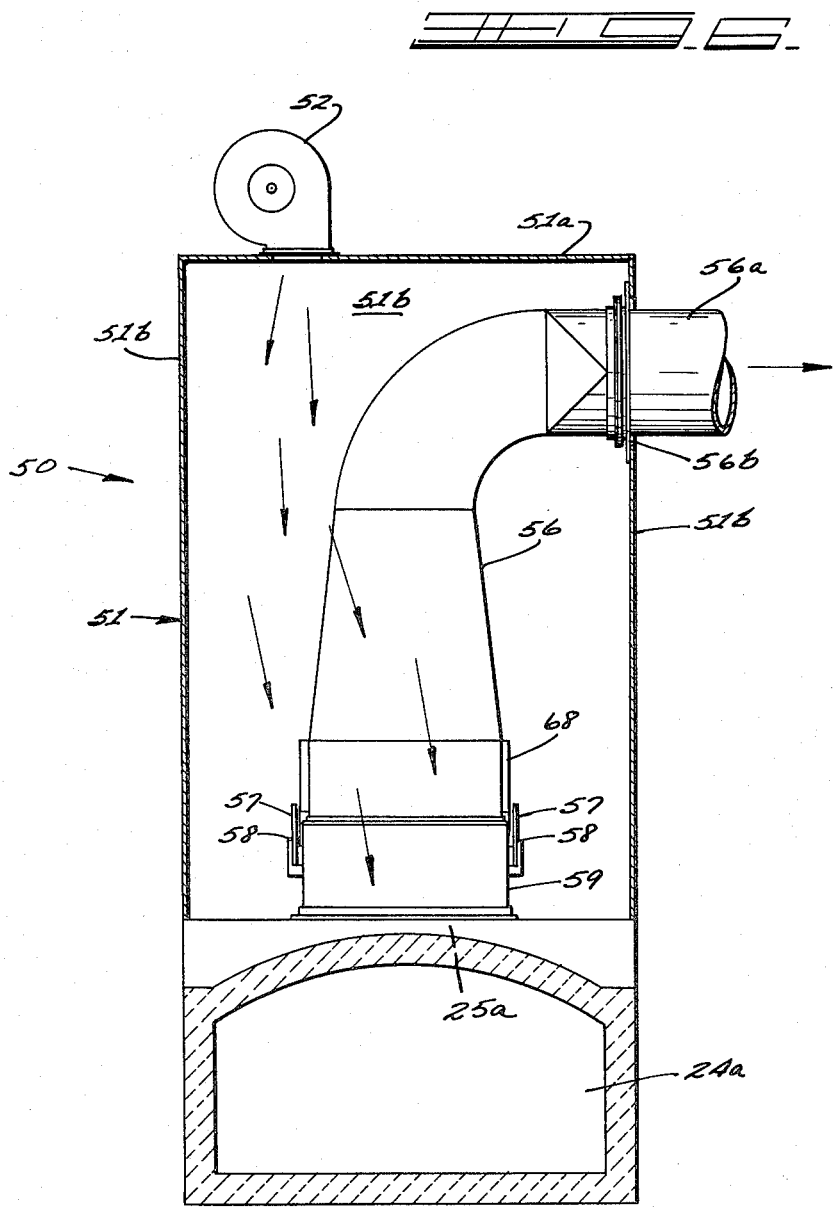
INVENTOR.
GEORGE E. KEEFER
BY J. R. Nelson
and W. A. Scheich
ATTORNEYS

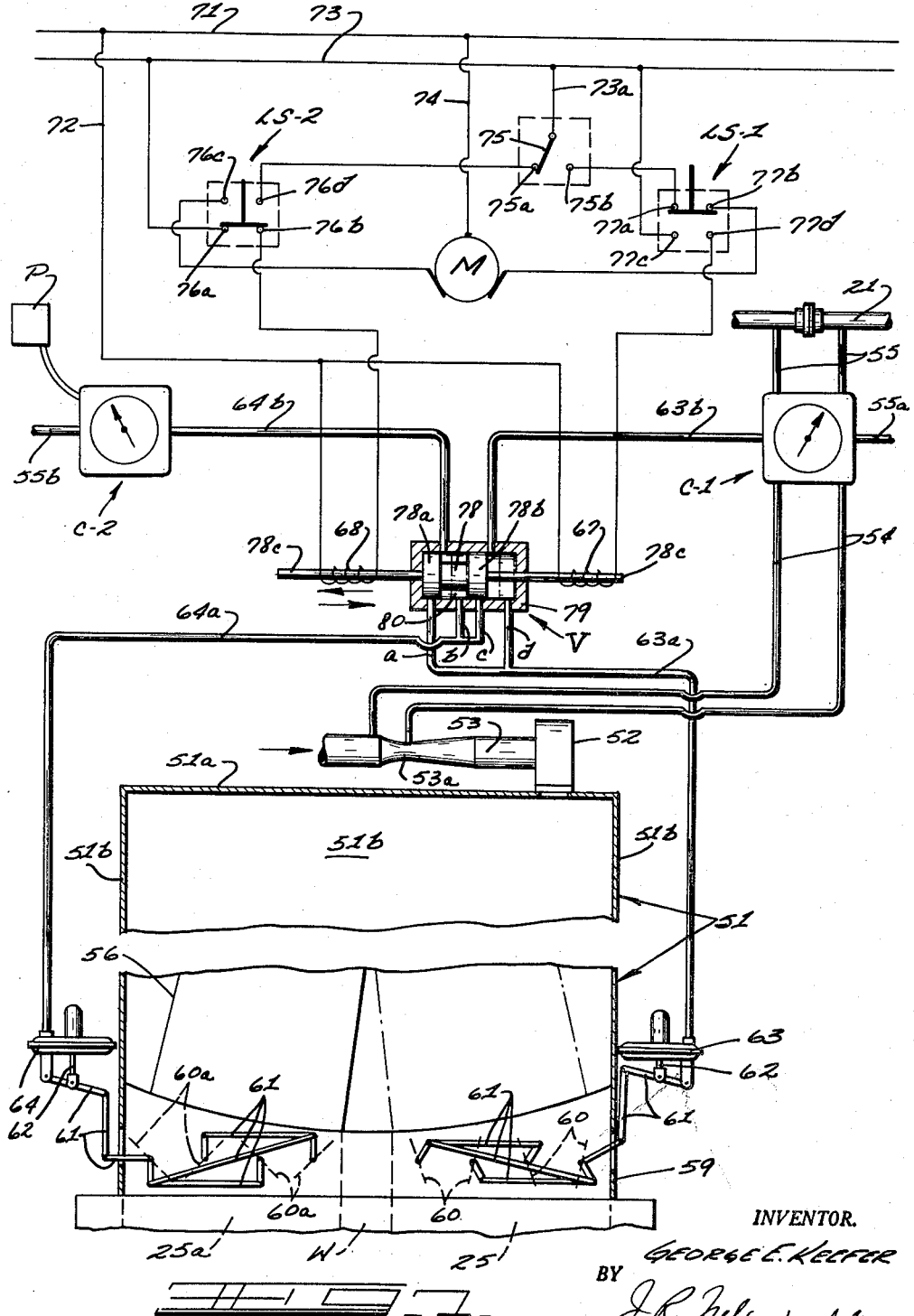

Feb. 23, 1965  G. E. KEEFER  3,170,680
DRAFT REVERSAL APPARATUS FOR FURNACES
Filed Sept. 26, 1962  6 Sheets-Sheet 6
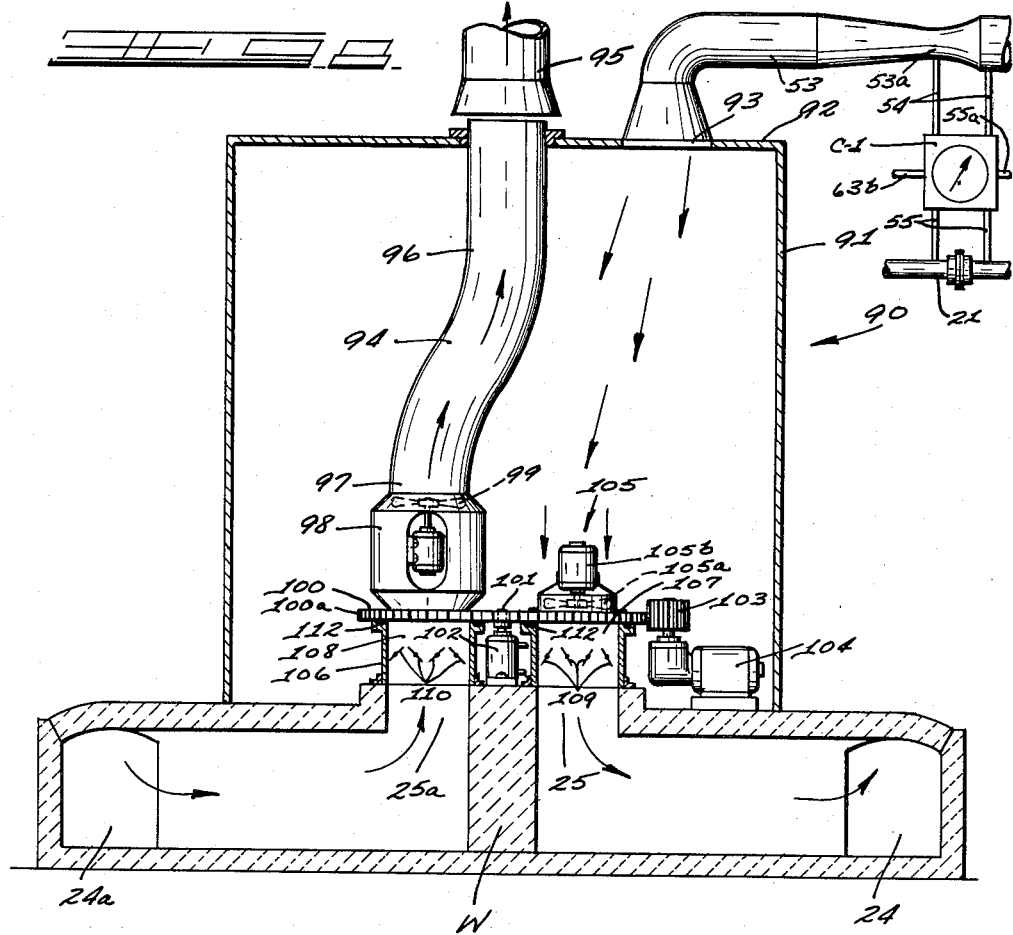
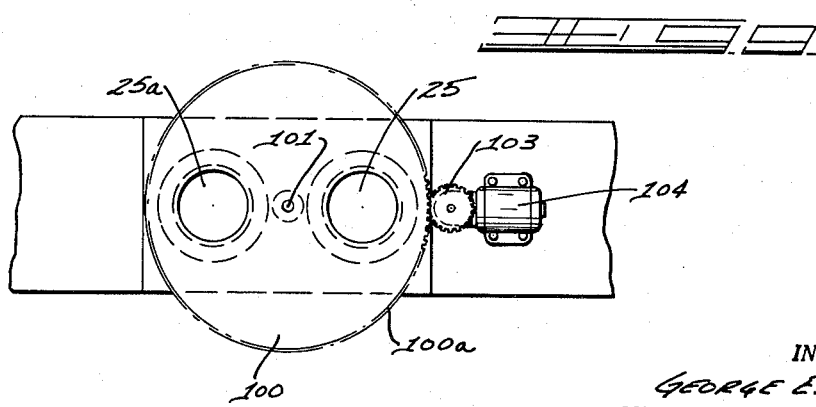
INVENTOR.
GEORGE E. KEEFER
BY
J. R. Nelson
and W. A. Schaich
ATTORNEYS

United States Patent Office 3,170,680
Patented Feb. 23, 1965

3,170,680
DRAFT REVERSAL APPARATUS FOR FURNACES
George E. Keefer, Sylvania, Ohio, assignor to Owens-Illinois Glass Company, a corporation of Ohio
Filed Sept. 26, 1962, Ser. No. 226,244
19 Claims. (Cl. 263—15)

The present invention relates to combustion furnaces. More particularly, the present invention relates to combustion furnaces of the regenerative type and will be described and illustrated in accompanying drawings in connection with a glass melting furnace. It is to be understood, however, that the invention is not to be limited thereto since the features and principles disclosed in the drawings and the description to follow will be of utility in connection with other combustion furnaces and/or operations wherein regeneration principles are beneficially employed or where reverse flow is desirably attained.

The regenerative-type furnace with which the invention is concerned has regeneration chambers or, what are in effect, heat storage chambers on opposite sides of the furnace. These chambers are employed to absorb and store heat contained in the hot waste gases which are directed through the opposed regeneration chambers in sequential fashion by appropriate control of the draft system. It is customary practice in such furnaces to periodically reverse the gaseous flow therewithin in order that these regeneration chambers are alternately exposed to hot exhaust gases and to cool inlet combustion air drawn from the atmosphere. The regeneration chambers contain an array of blocks formed of ceramic, refractory or brick so stacked and arranged as to leave considerable voids in the nature of tortuous passages for the hot waste gases or the cool inlet air. This provides a large amount of surface area for the absorption of the heat in the manner described. The array of blocks are frequently referred to in the art as "checkers."

While there are several mechanisms, valves and related apparatus for accomplishing a reversal of the gaseous flow in regenerative-type furnaces, most of the known systems have undesirable features which it is a general object of the present invention to overcome. The ordinary butterfly valve is one type of mechanism which has been employed in regenerative-type furnaces. However, it is not very satisfactory since it provides a poor, ineffective seal and consequently the furnace combustion operation is thermally inefficient. In addition, since regenerative-type furnaces are quite large and involve considerable amounts of inlet air and outgoing waste gases, the various components, ductways and the like of the butterfly valve must be quite massive to handle the load. Furthermore, since there is considerable heat involved, warpage of the necessary massive valve elements occurs, further reducing the sealing and thermal efficiency. The warpage of these elements is to be expected, however, since the hot waste gases leaving the furnace proper (measuring about 2700° to 2900° F.) are cooled down by the absorption of heat by the "checker" system in the regeneration chambers to a range of about 1250° F. which temperature is still quite harmful and capable of deleterious effects on the massive mechanical components. Butterfly valves are also operationally expensive due to their size, necessitating involved bearing structure to support them and, additionally, due to the maintenance requirements.

Various and sundry types of shifting ductwork arrangements have also been employed but experience has shown them to be subject to excessive leakage, leading to pronounced thermal inefficiency. In addition, the shifting type of ductwork arrangement has been found to require considerable positively-applied cooling in attempts to avoid warpage which would otherwise lead to mechanical jamming in the operation thereof. The latter, of course, adds to the expensive maintenance problem.

With the foregoing introduction it may be stated that it is a general object of the present invention to provide an improved apparatus of utility in effecting a reversal of gaseous flow in a combustion furnace system and particularly of the regenerative-type furnaces used in the glass melting industry.

It is another object of the present invention to provide such an apparatus which embodies features of construction which permits quick and easy reversal of the apparatus from a draft or outlet position over one regeneration chamber canal outlet to an outlet position over the other regeneration chamber canal outlet.

It is yet another object of the present invention to provide such an apparatus which is composed of relatively simple elements, all of which are easily accessible for whatever maintenance and repair may be necessary but which elements are so assembled that the maintenance and repair is held to a minimum by reason of the paucity of moving parts.

It is a specific and very important object of the present invention to provide an apparatus for reversing the direction of flow within a regenerative-type furnace, which apparatus additionally includes features improving and augmenting the thermal efficiency of the combustion process and, more specifically, the glass melting step carried out in the furnace.

It is another object of the present invention to provide a reversal apparatus which includes eminently desirable features permitting self-contained and automatic control of the furnace pressure in accordance with predetermined furnace operating practice, while at the same time correspondingly providing control of the flow of inlet air in accordance with sound combustion practice.

The objects, as hereinabove enumerated as well as many others, will become apparent to those skilled in the art from the following detailed description taken in conjunction with the annexed sheets of drawings on which there is presented, for purposes of illustration only, several embodiments of the apparatus of the present invention.

In the drawings:

FIG. 1 is an end elevation view, partly in section and with other portions broken away, of a glass furnace of the crown-top type, having opposed regeneration chambers and including a schematic illustration of the apparatus of the present invention shown assembled therewith.

FIG. 2 is a top plan view of the furnace shown in FIG. 1.

FIG. 3 is a side elevation view, with portions broken away for purposes of clarity, of the apparatus of the present invention, shown greatly enlarged in comparison to FIG. 1 and being shown in assembled relationship with the regeneration chamber canal outlets.

FIG. 4 is a partial sectional view taken on the line 4—4 in FIG. 3.

FIG. 5 is a side elevation view, partly in section and partly schematic, of a form of apparatus of the present invention representing another embodiment thereof and additionally including certain automated control elements associated therewith.

FIG. 6 is a side elevation view, partly in section, of the apparatus shown in FIG. 5.

FIG. 7 constitutes a schematic wiring diagram of the electrical circuitry and the pneumatic controls providing for automatic operation of the apparatus of the present invention in accordance with a preferred embodiment thereof; and also including a schematic representation of certain of the mechanical features of the apparatus of the invention as shown additionally in FIG. 5.

FIG. 8 is a side elevation view, with portions broken away for purposes of clarity, showing an apparatus representing another embodiment of the present invention.

FIG. 9 is a top plan view of the main parts of the apparatus of FIG. 8, disclosing the manner of movement of the apparatus.

The apparatus of the present invention finds its greatest utility in connection with the regenerative-type furnace characterized by a construction including opposed regeneration chambers, each of which is provided with a canal leading therefrom to terminate in generally proximate openings, which openings are used for the introduction of cool inlet air and/or the exhausting of hot waste gases. For such applications and for others, the apparatus of the present invention includes a housing constructed and arranged to embrace or enclose both of the aforesaid openings and including at least one inlet spaced from said openings for the admission of cool combustion air, an inner plenum located in said housing and having an outlet end and an inlet end, said outlet end extending in communicating fashion beyond the housing and, additionally, means for shifting the plenum inlet end from communicating connection with first one and then the other of the said canal openings whereby, when a draft is induced in the plenum and the plenum is shifted from one opening to another, the flow of gases in the said furnace will be reversed.

Apparatuses, as just hereinabove described, are of particular utility since there is provided, by the use thereof, an occasion for the exhaust hot waste gases (measuring in the neighborhood of 1200° to 1500° F.) to be brought into heat-exchanging contact within a confined space with cooler inlet air. The latter feature, together with the efficient shifting capable with the apparatus, as described more specifically hereinafter, provides a novel and greatly utilitarian apparatus which markedly improves many combustion operations and particularly those employing a regeneration system such as the glass melting industry.

Referring now more specifically to the drawings, particularly FIGS. 1 and 2, there is disclosed a crown top furnace 13 of the regenerative type and with which the apparatus of the invention finds particular utility. The furnace includes a principal firing zone 14 and chamber 15 containing a pool of molten glass G which is produced from a supply of glass forming ingredients introduced via the dog house 17 at one end of the furnace. The glass forming ingredients upon melting in the furnace proper are withdrawn via the channel 19 at one end of the melting zone 14. The molten glass, of course, can then be routed via forehearths and the like to any type of glass forming operations.

The glass forming ingredients are melted by the heat produced from the combustion of gaseous fuel emanating from opposed alternately firing nozzles 20 and 20a on opposite sides of the furnace, as illustrated, said nozzles being supplied with fuel through connected inlet pipes 21 extending through the side wall of the furnace to the nozzles 20 and 20a. A right hand regeneration chamber 22 and a left hand regeneration chamber 22a are in fluid communication with the melting zone 14 of the chambers via the constricted burner port portion 23. The chambers 22 and 22a each extend vertically downwardly to connect with canals 24 and 24a on the right and left, respectively. A wall W separates the canals 24 and 24a serving to aid in defining upwardly facing opening 25 in canal 24 and upwardly facing opening 25a in canal 24a. The openings serve the purpose of allowing inlet air or hot waste gases to be supplied or withdrawn.

The regeneration chambers 22 and 22a are filled with an open array of brick work B (commonly known as "checkers"), as shown, which serve to absorb heat. One apparatus, in accordance with the present invention and identified by the reference numeral 27, is shown schematically in FIG. 1 as vertically disposed generally above the openings 25 and 25a. The apparatus 27, as will be described, serves as an exhaust ductwork and at the same time a duct work for introducing combustion air. Thus, as shown in FIG. 1, the nozzle 20a on the left of the zone 14 has emanating therefrom a gaseous fuel, while the right hand nozzle 20 is in the off position. The apparatus 27 is being so controlled that inlet air is being forced through opening 25a in the left hand canal 24a and directed up the regeneration chamber 22a where it is considerably warmed by passage up through the "checker" system B. The waste gases on the other hand are traveling in the direction indicated by the arrows from the melting zone 14 down through the right hand regeneration chamber 22, through the right hand canal 24 and thence up through the right hand opening 25 through the apparatus 27 for exhaust to the atmosphere.

The apparatus of the present invention, identified by the reference numeral 27 in FIGS. 1 and 2, is shown somewhat enlarged and in greater detail in FIGS. 3 and 4. As can be seen, the apparatus is situated above the side by side openings 25 and 25a, respectively, of the canals 24 and 24a, leading from the regeneration chambers 22 and 22a, not shown in this view. The apparatus is composed principally of a pair of concentrically disposed, vertically situated, generally tubular duct members 28 and 29. The concentric ductwork composed of the inner duct 28 and the outer duct 29 are held in concentric relationship by the radial spoke members 30, shown in both FIGS. 3 and 4. The concentric ducts include between them an annular passageway 31 extending the axial length of the concentricity of the two ducts. The inner duct 28 extends axially upward and includes, in a somewhat enlarged section 32, a fan 33 powered by motor M driven to induce gaseous flow upwardly therein. The ductwork extends to an upper terminus 34 which may exhaust to the atmosphere or may connect with a stack (not shown) for carrying the exhaust gases away. A plurality of staggered baffle blades 35 are also contained in the inner duct 28 above the fan. In accordance with a preferred embodiment as discussed hereinafter, the baffles are in staggered array such that every other baffle is in parallel relationship and are controlled so they are collectively adjustable by pivoting action in spatial attitude, as will be described hereinafter in connection with another embodiment of the apparatus of the invention.

The outer duct 29 is provided at its upper end 36 with a lateral opening 37 connecting with horizontal ductwork 38 which terminates in an opening 39. The horizontal section of duct 38 includes a motor driven fan 40 therein to draw air in via the open end 39 and through an array of baffles 41 generally similar to the baffles 35 at the upper end 34 of the inner duct 28. The outer duct has at its lower end 42 a pair of opposed flared skirt or wall portions 43 and 44 which define passageways 43a and 44a in communication with the central annular passageway 31. The flared skirt portion defining the two passageways provide for a reversal system for the flow of gases in the canals. Thus, as shown in FIG. 3, the lower inlet end 45 of the inner conduit is in sealing communication with opening 25 of canal 24 and is resting on compressible asbestos sealing elements located on the upper edges defining the opening 25. In this position the passageway 44a, embraced by the flared skirt or wall portion 44, is in sealing communication with the opening 25a connected to the left canal 24a. The passageway lips rest on an asbestos sealing element located on the upper edge of the opening 25a. At the same time, the right hand passageway 43a is blocked by the generally curvilinear plate member 46 situated alongside the right hand opening 25.

The apparatus setup, as described above, operates thusly: The fan 40 forces air along the horizontal section of pipe 38, through opening 37 in outer duct 29, thence downwardly in the annular passageway 31 connecting with the passageway 44a, in turn connecting with opening 25a and thence to the left canal 24a. At the same time, the fan 33 in the inner duct 28 is pulling waste gases up the inner duct 28 through the inlet end 45 in communication with opening 25 of the right hand canal 24 and is, therefore, withdrawing hot waste gases. The concentric ducts can be shifted over to the left, as shown in dotted outline in FIG. 3. In this position the inlet end 45 of the inner duct 28 will be in communication with the opening 25a of canal 24a. At the same time, the left hand passageway 44a will be blocked by the plate 46a to the left of the opening 25a, while the right hand passageway 43a, defined by the flared skirt portion 43, will be in fluid communication with the right hand opening 25 in canal 24. Since the fans 33 and 40 are inducing flow in the same direction as just described, the effective direction of flow within the canals 24, and accordingly in the regeneration chamber 22 and furnace firing zone 14, will be reversed from that indicated by the arrows in the canal portions, although the flow within the passageways 43a and 44a and the annular passageway 31 will be the same.

Movement of the apparatus 27 as just described is accomplished by the sequential activation of cylinders 47 and 48. The cylinder 47, as can be seen in FIG. 3, is depending from superstructure S and has a reciprocable stem 47a depending therefrom to which is connected a pair of linear arms 47b, only one of which is shown. The arm 47b is pivotably supported at an auxiliary depending support member 47c and is pivotably secured near the upper end 34 of the inner duct 28, whereby activation of the cylinder 47 which may be pneumatic or hydraulic will cause the arm 47b to shift between the position shown in full line and the position shown in dotted line. The entire concentric ductwork 27 will raise when the stem 47a is fully extended and will lower when stem is retracted. Cylinder 48 at the lower right, which may be pneumatic or hydraulic, includes a horizontally extending stem 48a and is itself pivotably mounted in superstructure S. The stem 48a is pivotably connected to the flared skirt portion 43, as at 49. When the ductwork is raised by cylinder 47, cylinder 48 is activated and serves to push the lower end of the concentric duct apparatus in a lateral direction from the position shown in full line to the position shown in dotted line, whereupon the upper cylinder 47 can be activated to draw the stem 47a upward, causing a pivoting action of the arm 47b and a consequent lowering of the apparatus assembly 27 over the appropriate openings in the canals. To reverse the flow of inlet air and waste gas, one need merely repeat the sequence of activation of the cylinders causing the movement back to the right hand position, as shown in full line. The cylinders may be activated by hand controls or may be controlled by automatic timers. Furthermore, limit switches may be located proximate the lower end of the ductwork for activation of these elements.

The apparatus shown in FIG. 3 is eminently desirable in that it provides a very efficient and generous contact of the surface of the inner duct containing the hot exhaust gases with inlet aid contained in annular passageway 31. Furthermore, the size of the annular passageway 31 provides in effect a thin film of the cool inlet air passing downwardly about the hot outer surface of inner duct 28. If desired, the outer surface of the inner duct and/or the inner surface of the outer duct may be modified by including baffles or the like constructed and arranged to define a downwardly spiralling path for the inlet combustion air. In order that a most efficient exchange of heat may take place between the hot gases within the inner duct and the cool inlet gases within the annular passageway 31, it is most preferable that the inner duct be formed of a relatively thin metal offering the least resistance to the flow of heat.

Referring now to FIGS. 5, 6 and 7, there is disclosed an apparatus 50 representing an embodiment of the present invention generally similar to the apparatus 27 of FIG. 3, but differing in certain respects and being shown in combination with certain control features representing a preferred practice of the invention. The apparatus 50, like the apparatus 27 representing the embodiment of FIG. 3, is shown situated in upstanding vertical position over the openings 25 and 25a of the right hand and left hand canals 24 and 24a separated by the wall W.

The apparatus 50, in accordance with this embodiment, is composed of a generally upstanding hollow chamber 51, composed of a horizontal top wall 51a and four connected vertical side walls 51b, the latter being spaced apart laterally a sufficient distance that both of the openings 25 and 25a are enclosed thereby. One wall of the housing chamber has situated therein an inlet housing 52 containing a centrifugal blower 52a driven by a motor 52b. The inlet housing connects with a lateral conduit 53, through which the inlet air is pulled by the blower 42a upon activation of the motor. Inside of the housing chamber 51 there is situated an upstanding, generally hollow, tubular plenum member 56 which at its upper end connects with horizontal pipe 56a extending via a flange connection 56b through the wall 51b of the main housing 51. The flanged connection 56b, through which the pipe extends, is so constructed that it permits some vertical movement of the plenum 56. The plenum is shiftable from the position shown in full line on the left to the position shown in dotted line on the right. The plenum pivots about the axis of the horizontal pipe 56a and, as a consequence, the lower end of the plenum 56 moves in an arcuate path. The lower inlet end is thereby alternately located over the left and right hand openings 25a and 25 for alternate exhausting of waste gases upwardly therethrough and out the horizontal pipe section 56a. The latter may desirably connect with an induced draft stack, not shown.

The mechanism for shifting the lower inlet end of the plenum is disclosed and discussed in more detail in my co-pending application, Serial No. 204,004, filed June 20, 1962, and entitled "Regenerative Furnace Draft Reversal Apparatus."

For purpose of disclosure herein, suffice it to say that plenum 56 is supported on roller wheels 57 which ride on a pair of parallel arcuate tracks 58 situated on opposite sides of the openings 25 and 25a. Alongside the track 58 on one side are situated a right hand limit switch LS-1 and a left hand limit switch LS-2. These are located in a position where they can be contacted alternately by a crank arm 65 which pivots about a shaft 66, horizontally disposed above wall W. The crank arm 65 serves to shift the plenum as the shaft is rotated by a motor, not shown in FIG. 5 but illustrated schematically in FIG. 7 and designated by reference letter M. Thus, the end of the crank arm 65 opposite the connection to the shaft 66 bears a roller projection 67 adapted for sliding travel in vertically disposed trackway 68 secured to the plenum duct. The shaft rotates through an arc of just less than 180°, as explained in more detail in the above referred to co-pending application, Serial No. 204,004. As a consequence, the rotation of the shaft 66 will cause the roller 67, pivotally secured at the opposite end of the crank arm 65, to slide up in the trackway 68, thereby moving the lower end of the plenum 56 to the right, to the position shown in dotted line, whereupon it will contact limit switch LS-1. Conversely, when the plenum is switched back in the manner to be described hereinafter, the crank arm will contact the limit switch LS-2. The purposes of the limit switches will be set forth hereinafter.

An adapter ductwork 59 is situated over the canal openings 25 and 25a and aids in permitting the lower end of the plenum to connect sealingly with the canal openings. The adapter ductwork contains, on its upper edge defining the opening for connection with the inlet end of the plenum, a continuous strip of compressible asbestos which is engaged by the lower edges of the inlet end of the plenum and thereby compressed to effect a tight seal. The ductwork 59 also includes independent passageways connecting with the openings 25 and 25a. The adapter ductwork 59 contains in the independent passageways two arrays of baffle elements, identified by the reference numerals 60 and 60a, respectively. Each of the arrays is composed of four blade-like members which are in parallel relationship and each spans the lateral area of the respective openings 25 and 25a, respectively. The baffles, depending on their spatial attitude, leave the canal openings 25 and 25a essentially unobstructed or throttled to any given degree. Each array of blades 60 and 60a operate independently but the individual blades of each array are linked together by arms 61 so that the blades pivot as a unit in each array. The arms 61 are all pivotably connected and ultimately to a stem member 62 depending from an air or diaphragm motor 63 on the right. Baffle elements composing an array 60a over the left hand opening 25a are similarly pivotably connected by arms 61 in turn connected to the depending vertical stem 62 of a left hand air diaphragm motor 64 on the left hand side. The array of baffles 60 and 60a and their associated linking arms are shown in somewhat more detail in FIG. 7.

The air diaphragm motors 63 and 64 are governed, in controlling the extent of the associated stem element and the attitude of the baffle blades, by the pressure within air inlet lines 63a and 64a, respectively. The pressure in these two lines is in turn controlled by controllers C-1 and C-2. The controllers, for purposes of illustration, are shown as being a furnace pressure controller C-2 and a fuel/air ratio controller C-1, respectively. Since these controllers are governing the spatial attitude of the respective array of baffles 60 and 60a through the air diaphragm motors 63 and 64 and since the spatial attitude of the baffles are desirably different depending on whether inlet air is passing therethrough or whether waste gases are passing therethrough, it is necessary to reverse the connections by an easily adjustable means. Thus, the plenum conduit 56 serves as the exhaust member and when it is situated over the left hand opening 25a, it is desirable that the array of baffles 60a should be adjusted (thereby throttling or opening canal opening 25a) responsive to the pressure within the furnace. Similarly, it is desirable that the attitude of the array 60 of baffles over canal opening 25 (serving as an inlet for cool air) should be responsive to the fuel/inlet air ratio. The connection may be reversed in a convenient manner by the utilization of a four-way valve generally, identified by the reference letter V. The four-way valve is shown schematically in FIG. 5 and in somewhat more operative detail in FIG. 7. The valve will be discussed in more detail in a description of the circuitry and control system in FIG. 7 hereinafter. Suffice it to say that the valve in its left hand position permits a straight through connection of line 64a and line 63a with line 64b and line 63b, respectively, on the other side, as seen in FIG. 5. In this position the air pressure reaching the right hand diaphragm motor 63 emanates from the fuel/air ratio controller C-1 via line 63b and connecting line 63a, while the air pressure reaching left hand diaphragm motor 64 emanates from another controller C-2 via line 64b and line 64a. The controller C-2 is responsive to the pressure within the furnace. Controller C-2 may be responsive to the oxygen content of the waste gases or responsive to the volume of air passing into the furnace. The valve V can assume a right hand position which reverses the connection. Thus, line 63b instead of connecting with line 63a will connect with line 64a. Similarly, line 64b will connect with line 63a instead of line 64a. This is illustrated schematically by the crossover "X" bearing the reference letter X in FIG. 5. The schematically illustrated solenoids 67 and 68 serve to move the valve between the two positions permitting the reversal of the line connections as just described.

The fuel/air ratio controller C-1 receives impulses via a pair of impulse lines 54 connecting with air inlet pipe 53. One of the lines 54 connects with the pipe 53 at the periphery of its normal diameter, while the other connects at a restricted throat 53a, thereby permitting a measurement of the flow rate of the inlet air induced by blower 52a. The ratio controller C-1 also receives impulses from a pair of lines 55 connecting with the fuel supply pipe 21, thereby permitting a measurement of the flow rate of the combustible fuel. The controller C-1 is adjusted in a preselected manner to reduce supply air (15-25 lbs.) entering via line 55a to a lesser value which is delivered via lines 63b, through valve V to lines 63a or 64a depending on the position of the valve V. The furnace pressure controller C-2 receives an impulse from the pressure sensing probe P (also seen in FIG. 2 in furnace chamber 15) and accordingly adjusts the supply air (15-25 lbs.) entering via line 55b to a lesser value which is delivered via line 64b through valve V to lines 63a or 64a depending on the position of the four-way valve V.

The operation of the mechanical movement of the plenum, the reversal of the control elements and the function of the solenoids and its limit switches will be more clearly understood by reference to FIG. 7 in connection with which a description of the electrical circuitry and its interrelationship with the various control features will now be given.

Line current enters via line 71 and thence passes via line 72 through one or the other of the solenoid coils 68 or 67, depending upon the position of the terminal contacts of limit switches LS-1 and LS-2 returning thence to line 73. As shown, left solenoid 68 would be energized while right solenoid 67 would not. Line current from line 71 can also pass through line 74 to motor M, depending upon the contact of the poles of the limit switches referred to and also depending upon the connection of the main reversal switch 75 which is connected to the other main current line 73. The main reversal switch 75 contacts either with contact 75a or contact 75b. This main reversal switch is controlled either manually or by a timer. Since timers are well known in the art, they need not be discussed in detail. In this operation the time is usually adjusted so that switch 75 alternates in contact with poles 75a and 75b at twenty to thirty minute cycles. Left limit switch LS-2 is shown in a depressed position. It is then connecting contacts 76a and 76b, thus putting the solenoid coil 68 in series connection with the main current lines 71 and 73. The limit switch LS-2, in its normal or released position, connects contacts 76c and 76d and thus puts the line current 71 in series connection with the motor M via line 74, the contacts 76c and 76d, the main reversal switch contact 75a and line 73a connecting with line 73. Limit switch LS-1, as shown, is in its normally or released position connecting contacts 77a and 77b. In this position the motor M is disconnected because the main reversal switch contact 75b is not connected to line 73a. In its depressed position limit switch LS-1 will connect contacts 77c and 77d, energizing the right hand solenoid coil 67 since it will be in series with line current 71 through line 72, limit switch contacts 77c and 77d, and line 73. Sequential energization of solenoid coils 67 and 68 causes the valve V (discussed briefly hereinabove) to assume either of two positions. In one position the air control line from one controller C-1 will be in communication with one of the two diaphragm motors (63 or 64) while the other controller C-2 will be in communication with the other diaphragm motor. In the other position the controller-diaphragm motor connections will be reversed. This is illustrated in detail by reference to FIG. 7 wherein the valve V is seen to be composed of a hollow cylinder 79 having therein a movable spool 78. The spool includes integral stem extensions 78c on each end which constitute a part of the solenoids 67 and 68 and upon sequential activation thereof, axial movement of the plug within the cylinder is effected. The cylinder 79 has two inlet ports directly connected to inlet lines 63b and 64b. The cylinder also contains four outlet lines on the opposite side, two of which connect with line 64a leading to the left diaphragm motor 64 and the other two of which connect with line 63a leading to the right end diaphragm motor 63. The spool 78 has spaced annular "land" portions 78a and 78b on either side of the central portion of reduced diameter thereby defining an annular passageway 80 for flow of line air therethrough. The "land" positions also serve to block two of the four exit lines a, b, c and d when the spool is in a left full line position and two other of the four lines when the spool is at the right, as shown in dotted outline. When in the left position line 64b connects with line 64a since lines a and c are blocked. When in the right hand position the connections are reversed by reason of the blocking of two lines b and d. There has thus been described in extremely simplified fashion a four-way reversal valve, permitting control air from a furnace pressure controller C-2 and control air from a fuel/air ratio controller C-1 to be reversed from one air diaphragm motor 63 to the other 64 and vice versa. A commercial four-way valve controlled by dual solenoids, suitable for use in the reversal of controls as described herein, is manufactured by the Automatic Switch Company of Florham Park, New Jersey.

With the components, switches, controls, etc., situated and connected, as shown in FIG. 7, control air from furnace pressure controller C-2 is connected directly to air diaphragm motor 64. The amount of air pressure exerted thereon will determine the vertical travel of stem 62, thus controlling through the connected series of control levers 61 the spatial attitude of the array of baffles 60a. Similarly, the right hand fuel/air ratio controller C-1 directs control air to the right hand air diaphragm motor 63 and controlling the vertical extension of stem 62 which is connected to control 61, thereby adjusting the spatial attitude of the right hand array of baffles 60. The furnace pressure controller C-2 is connected to and receives an impulse from a pressure responsive element P located within the combustion zone of the furnace (see FIG. 2). The furnace pressure controller C-2 is well known in the art and need not be described in detail. One such suitable device is manufactured by Bailey Meter Company of Cleveland, Ohio. It is normally so adjusted that pressures between 0.05 to 0.2 inch of water pressure in the furnace will be reflected in an appropriate air pressure in line 64a sufficient to control the extent of the travel of stem 62, thereby automatically controlling the spatial attitude of the baffles 60a anywhere from a substantially full open to a substantially full closed position.

The baffle elements spanning the openings 25 and 25a are used to control the volume of waste gases or combustion air passing through these openings. That is, they serve to throttle somewhat the free flow of exit gases proceeding upward through the plenum. The blade or baffle elements may be adjusted in either of two known manners; one being the opposed blade type action, which I prefer and disclose in the drawings, and the other being the parallel blade action, which may be likened to the motion of the elements or blades of a common "venetian blind." The opposed blade action, wherein every other blade is in parallel relationship, provides a more accurate adjustment and control of the amount of gases proceeding therethrough and is, therefore, preferred.

Air/fuel ratio controller C-1 (on the right in FIG. 7) is adapted to receive impulses from the fuel line 21 and from the air inlet line 53. Using these impulses in accordance with preselected adjustments in its mechanism in accordance with known techniques, it adjusts the line air pressure of 15 to 25 lbs. to a lower value. This lower value pressure is transmitted via line 63b, through the four-way valve V and is exerted upon either the right hand diaphragm motor 63 or the left hand diaphragm motor 64, depending upon the position of the valve.

As described in this embodiment, the air diaphragm motors are controlled by or are responsive to the pressure within the furnace and the ratio of fuel supplied to the furnace as compared to the volume or rate of air fed to the furnace. It will be appreciated that instead of these particular stimuli, that other stimuli, such as the oxygen content of the waste gases as determined by automatic analysis thereof, or the volume of air passing through the air intake, may be substituted. Devices for measuring the oxygen content of the waste gases or the fuel/air ratio and/or the furnace pressure are known and their normal function in furnace operation understood by those skilled in the art. Devices of this character are manufactured by the Bailey Meter Company of Cleveland, Ohio. It should, of course, be understood that the foregoing description of the automatic control for adjusting the blade, baffle elements, etc. is for purposes of disclosure. As a consequence, it will be appreciated that these may be properly adjusted by hand or means other than those described herein.

The various elements, e.g. switches, valves, baffle elements and the like, are in proper connection and position for the exhausting waste gases through the left opening 25a and upward through the plenum 56.

To effect a reversal of the flow within the regenerative-type furnace, one simply moves the main reversal switch 75 to the right into contact with pole 75b. This, of course, can be and usually is desirably controlled by an automatic timer adjusted to reverse the switch from the one contact point 75a to the other contact point 75b at preselected desired time intervals, such as about every 15 to 20 minutes. When the switch is so thrown, line current is supplied across limit switch contacts 77a and 77b, energizing the motor M which rotates shaft 66 and connected crank arm 65 clockwise, thus shifting the lower end of the plenum 56 to the right position (shown in dotted line) in a manner described hereinabove. As soon as crank arm 65 begins to move, the limit switch LS-2 is disengaged whereby contacts 76a and 76b are disconnected while contacts 76c and 76d are reconnected by the return of the switch to its normal position. The disconnection of contacts 76a and 76b de-energizes solenoid coil 68. As the motor M-1 continues to rotate shaft 66 connected to crank arm 65, the plenum 56 moves to the right (in dotted outline) position over the right hand opening 25 and immediately commences exhausting of waste gases therethrough. At the same time, the left hand opening 25a will now be unobstructed except by the appropriate spatial attitude of the left hand array of baffles 60a. When the plenum 56 reaches the extreme right hand position, the right hand limit switch LS-1 mounted proximate the curvilinear track 58 is engaged by the crank arm, thus opening contacts 77a and 77b, interrupting the current flow leading to the motor and thereby de-energizing the motor whereby movement of the plenum 56 stops. At the same time, contacts 77c and 77d of limit switch LS-1 are connected, energizing solenoid coil 67 causing the spool 78 within the four-way valve barrel 79 to move to the rightmost position. In this position the line connections are such that the fuel/air ratio controller C-1 is supplying control air through the line 63b, the valve V, line 64a and thence to the left hand air diaphragm motor 64, controlling in turn via stem 62 and the levers 61, the left array 60a of baffle elements over opening 25a. At the same time, the furnace pressure controller C-2 supplies control air through line 64b, the valve arrangement and thence to line 63a leading to right hand air diaphragm motor 63, controlling in turn via stem 62 and levers 61, the right hand array 60 of baffle elements over the right hand opening 25. In this position the flow within the furnace zone 14, the regeneration chambers 22, 22a and their associated canals 24 and 24a will be reversed. That is, the waste gases will proceed downwardly through the right hand regeneration chamber 22, through the canal 24 and upwards through opening 25 and the plenum 56. At the same time, air will proceed through the inlet pipe 53 into the housing chamber 51 and into contact with the outer surface of plenum 56. Thence the warmed up air will proceed down through the left hand opening 25a into the canal 24a on the left and up the left hand regeneration chamber 22a.

As indicated previously, the apparatus of the present invention provides an extremely efficient valving control of the flow of combustion air introduced to the regenerative furnace system and the exhausting of waste gases therefrom. Furthermore, the changeover in direction of flow in the regeneration chambers is accomplished simply and speedily. The automatic cycling of the plenum and adjustment of the rate of flow of the inlet air and the waste gases, as permitted by the control features of this invention operating in conjunction with the shiftable reversal apparatus, provides essentially operator-free operation and, in addition, the provision for contact of the hot waste gases proceeding from the regeneration chambers with inlet air in the housing chamber provides greater thermal efficiency than possible heretofore.

Referring now to FIGS. 8 and 9, there is disclosed an apparatus 90 representing a further embodiment of the present invention. This embodiment is somewhat similar to the embodiment of FIG. 5 and is disclosed in upstanding position over the openings 25 and 25a of the right and left hand canals 24 and 24a, respectively. This apparatus 90 is composed of a generally hollow housing 91, situated so as to embrace the openings 25 and 25a. A horizontally disposed top wall 92 includes an opening 93 connected to inlet pipe 53 for introduction of air to the chamber housing 91. An inner plenum member 94 is disposed vertically within the chamber and is connected to vertical conduit 95 which extends through the upper wall 92 for connection with a stack (not shown) or to the atmosphere. The center section of the plenum member is curvilinear and has opposed axial ends 96 and 97 which are in parallel offset relationship. Upper end 96 connects with conduit 95. Lower end 97 includes a somewhat enlarged portion 98 which contains a motor driven fan 99 for directing gases in an upward direction therethrough to the conduit 95. The lower end of the enlarged section 98 is sealingly mounted in an annular, horizontally-disposed support member 100. The annular support member 100 is mounted centrally between the openings 25 and 25a on a rotatable pin 101 extending from an air cylinder 102, which on activation by appropriate means is capable of lifting the annular support member 100 and the entire plenum 94. The outer periphery of the annular support member 100 is definitive of a gear having teeth 100a which engage a gear member 103 driven by a motor 104, whereby appropriate activation of the motor will cause the gear 103 to rotate and, consequently, the annular support member 100. The annular support member 100 also contains mounted thereon, and 180° disposed from the plenum connection, an induced draft unit 105, composed of a fan 105a and a motor 105b thereabove adapted to force air from the chamber 91 down through the opening 25 and thence into the right hand canal 24.

Just beneath the annular support member 100 there is situated adapter ductwork generally designated 106 containing passageways 107 and 108 leading from the annular support member down to the respective openings 25 and 25a. An array of baffles 109 is contained in the passageway 107, while a similar array 110 is contained in passageway 108. Each array is independent and can be controlled in spatial attitude in much the same manner as the baffles 60 and 60a, described hereinabove in connection with the embodiment of FIGS. 5 through 7. To effect reversal of the flow in the regenerative-type furnace, in accordance with this embodiment, one need simply activate the cylinder 102 whereupon the annular support 100, resting on the stem 101, will rise slightly lifting the plenum 94 from the asbestos sealing rings 112 at the top edges of the support ductwork 106. Next, the motor 104 is activated by appropriate means to revolve the support member 100 through an arc of 180°, whereupon the motor is turned off and the cylinder 102 activated to lower the support member 100 down with the lower end of the plenum 97 and the induced draft unit in opposite locations. The contour of the plenum with its offset axial ends as described permits the plenum to be revolved to either of the two positions, e.g. over opening 25 or opening 25a.

The air inlet pipe 53 includes a constricted throat portion 53a. Impulse lines 54 connected thereto and to its normal outer periphery lead to a controller C–1. The controller also receives impulses from impulse lines 55 connected to the fuel line 21. The controller receives supply air through line 55a and in accordance with preselected adjustment, and the relative rate of flow of inlet air and fuel reduces supply air to a lower valve which pressure is transported through outlet line 63b. Although not shown, this line desirably leads through a four-way valve and thence to either an air diaphragm motor controlling the spatial attitude of the array of baffles 109 or the air diaphragm motor controlling the spatial attitude of the array of baffles 110. Likewise a furnace pressure impulse desirably operates through a controller like controller C–2, in FIG. 5, to control the spatial attitude of one of the array of baffles 109 or 110. Details of the pipe connections, etc., are not shown in this figure nor described, since reference may easily be had to the description of FIG. 5 which may be followed in connection with the present embodiment to provide accurate and automatic control and cycling of the apparatus in accordance with efficient furnace practice.

The apparatus of the embodiment described herein permits an easy and quick shifting of the plenum 94, thereby accomplishing a reversal in flow in a speedy manner. At the same time, it allows the hot waste gases within plenum 94 to be brought into intimate close contact with the inlet air proceeding through the chamber housing 91.

The arrangement calling for the independent array of baffle elements shown in the embodiments of FIGS. 5 and 8 can be employed in the embodiment of FIG. 3. However, for clarity of illustration this feature was not disclosed in the embodiment of FIG. 3.

In the several embodiments disclosed herein I have shown the hot waste gases proceeding either through the inner duct 28 (FIG. 3), the plenum 56 (FIG. 5) or the plenum 94 (FIG. 8). It will be appreciated that the apparatus could be so connected that the inlet air would proceed therethrough while the hot waste gases would pass in the outer duct 29 (FIG. 3), the chamber 51 (FIG. 5) or the chamber 91 (FIG. 8). I prefer the apparatus as disclosed, however, since all the heat given up during the travel of the waste gases through the reversal apparatus is absorbed by combustion air, thus reducing the ultimate fuel requirements.

By the term plenum duct means as used, I mean a generally elongate tubular conduit which is essentially closed execept for the openings at opposed ends of the tubular conduit.

With the foregoing description it is seen that there has been provided a new and novel furnace exhaust apparatus and very efficient controls therefor, which apparatus provides advantageous features not known heretofore. Modifications may be resorted to without departing from the spirit and scope of the invention.

I claim:

1. An apparatus for reversing the flow of inlet air and waste gases in a regenerative-type combustion furnace, said furnace being characterized by a construction including opposed regeneration chambers each having a canal leading therefrom to terminate in generally proximate openings, said apparatus comprising a housing enclosure adapted to embrace both of said openings, said housing including at least one inlet opening for admitting combustion air, an inner generally elongate, essentially closed, tubular conduit having open inlet and outlet ends within said housing, said inlet end being movable, said outlet end extending communicatingly beyond said housing, and means for cyclically moving said conduit inlet end from communicating connection with first one and the other of said proximate openings, whereby as draft is induced in said conduit and said conduit is moved, the flow of gases in said furnace will be adapted to be reversed.

2. Apparatus as claimed in claim 1, which includes, in combination therewith, adjustable means for varying the flow capacity of said openings.

3. Apparatus as claimed in claim 2, wherein said adjustable means for each of said openings are independently operable.

4. Apparatus as claimed in claim 3, wherein said adjustable means comprise an independent array of baffle elements adapted for extending across each of said openings.

5. Apparatus as claimed in claim 4, which includes first sensing means responsive to a first stimuli, first control means connected to said first sensing means and to one array of said baffle elements for variable control of the spatial attitude of said baffle elements, second sensing means responsive to a second stimuli, and second control means connected to said second sensing means and the other array of said baffle elements responsive for variable control of the spatial attitude of said other baffle elements.

6. Apparatus as claimed in claim 5, which includes a third control means responsive to the position of said tubular conduit inlet end, and wherein said first and second control means are operatively linked to and responsive to said third control means to thereby reverse their responsiveness of said first and second control means to said first and second sensing means.

7. Apparatus as claimed in claim 4, wherein said baffles are of planar construction and every other one is in parallel relationship.

8. Apparatus as claimed in claim 7, wherein said arrays of baffles are independently movable in spatial attitude responsive to different preselected stimuli.

9. Apparatus as claimed in claim 8, which includes control means for switching the connection of the sensing means to said arrays.

10. Apparatus as claimed in claim 1, wherein said tubular conduit outlet is generally normally disposed to the axial length of said plenum and said plenum pivots about said outlet whereby said plenum inlet end shifts in an arcuate path.

11. Apparatus as claimed in claim 10, wherein said apparatus includes track means coextensive with said openings and follower means mounted on said inlet end of said plenum and thereby adapted to supportingly follow said track means to effect shifting of said inlet end of said tubular conduit.

12. Apparatus as claimed in claim 1, wherein the tubular conduit end segments containing said outlet and inlet are in parallel offset relationship whereby said inlet end segment is capable of shifting in a circular offset path about the axis of said outlet-end-containing segment, said path being preselected to bring said inlet end in sequential registry with both of said openings.

13. Apparatus as claimed in claim 12, which includes a support means carrying said inlet end of said tubular conduit, said support being rotatable about a point midway between said openings and means for rotating said support.

14. Apparatus as claimed in claim 13, which includes lift means for raising and lowering said annular support.

15. Apparatus as claimed in claim 13, which includes a self contained blower unit carried on said annular support in such location that as the inlet end is in registry with one of said openings, the blower unit will be in registry with the other opening.

16. Apparatus for reversing the flow of inlet air and waste gases in a regenerative-type combustion furnace, said furnace being characterized by a construction including opposed regeneration chambers each having a canal leading therefrom to terminate in generally proximate openings adapted for alternate communication with a stack, said apparatus comprising a generally hollow housing enclosure adapted to embrace both of said openings, said housing including at least one inlet opening for combustion air, means for positively inducing a flow of combustion air through said inlet opening, a generally elongated tubular conduit having open inlet and outlet ends located within said housing, said inlet end being shiftable, said outlet end extending communicatingly beyond said housing to connect with an exhaust stack, means for inducing positive flow in said tubular conduit in the direction of said stack, and means for moving said inlet end from a position communicating with one of said canal openings and a position communicating with the other of said canal openings, said housing and tubular conduit defining therebetween an elongate chamber where the heat of exhaust gases in said inner duct is transferred to inlet combustion air.

17. Apparatus for reversing the flow of inlet air and waste gases in a regenerative-type furnace, said furnace being characterized by a construction including opposed regeneration chambers, each having a canal leading therefrom to terminate in generally proximately located openings, said apparatus comprising a pair of linear generally concentric duct members secured together to define a generally annular and generally axially extending pathway therebetween, the inner duct member including an inlet end individually connectible with said openings and an outlet end, the outer duct member terminating in two spaced passageways proximate said inner duct inlet end, both of which passageways communicate with said pathway and being individually connectible with one of said openings, means for shifting said pair of duct members between a first position wherein the inner duct inlet end connects with one of said openings and one of said passageways connects with the other of said openings, and a second position wherein the inner duct inlet end connects with the other of said openings and the other of said passageways connects with the opposite opening, said outer duct also including an inlet generally spaced from said openings and fan means inducing flow in said pathway, whereby the direction of flow in said regenerative-type furnace is adapted to be responsive to induced flow in said pathway and will depend on the position of said pair of duct members.

18. Apparatus as claimed in claim 17, wherein said apparatus includes a pair of blade members constructed and arranged to extend laterally outwardly from said openings to block said passageways in sequence as said apparatus rests in the other of said two positions.

19. Apparatus for reversing the flow of inlet air and waste gases in a regenerative-type furnace, said furnace being characterized by a construction including opposed regeneration chambers, each having a canal leading therefrom to terminate in generally proximately located openings adapted for alternate communication with an induced draft stack, said apparatus comprising a pair of linear generally concentric duct members defining an axially extending and generally annular pathway therebetween, the inner duct member including an inlet end capable of sequential communication with said openings and an outlet end, said outer duct member including two generally spaced flared skirt portions proximate said inner duct inlet end, both of which portions communicate with said pathway and being individually adapted to be connected with said openings when said duct inlet end connects with the other opening, means for reversibly shifting said pair of duct members between a first position wherein the inner duct inlet end is adapted to connect with one of said openings and one of said flared skirt portions is adapted to communicate with the other of said openings and a second position wherein the inner duct inlet end is adapted to connect with the other of said openings and the other of said flared skirt portions is adapted to communicate with the opposite opening, said outer duct also including an inlet generally adapted to be spaced from said openings and fan means inducing unidirectional flow in said pathway, whereby the direction of flow in said regenerative-type furnace will depend on the position of said pair of duct members.

References Cited in the file of this patent

UNITED STATES PATENTS

| | | |
|---|---|---|
| 83,176 | Laird et al. | Oct. 10, 1868 |
| 1,170,397 | Bell | Feb. 1, 1916 |
| 1,307,004 | Geer | June 17, 1919 |
| 1,635,939 | Isley | July 12, 1927 |
| 2,118,799 | Willetts | May 24, 1938 |
| 2,780,983 | De Roo | Feb. 12, 1957 |